United States Patent
Schwarzenthal et al.

(10) Patent No.: US 7,308,355 B2
(45) Date of Patent: Dec. 11, 2007

(54) METHOD AND CONTROL DEVICE FOR DIAGNOSING A CHARGE CYCLE VALVE STROKE ADJUSTING SYSTEM OF AN INTERNAL-COMBUSTION ENGINE

(75) Inventors: Dietmar Schwarzenthal, Ditzingen (DE); Nils Nagel, Leonberg (DE); Thomas Melzig, Leonberg-Hoefingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/472,457

(22) Filed: Jun. 22, 2006

(65) Prior Publication Data

US 2006/0293832 A1    Dec. 28, 2006

(30) Foreign Application Priority Data

Jun. 23, 2005    (DE) .................. 10 2005 029 137

(51) Int. Cl.
    *G01M 15/10*    (2006.01)
(52) U.S. Cl. ........................ 701/114; 73/116
(58) Field of Classification Search ........... 701/107, 701/111, 112, 114; 60/274, 276, 277, 281, 60/285, 286; 123/479, 688; 73/116, 117.1, 73/117, 118
    See application file for complete search history.

(56) References Cited

U.S. PATENT DOCUMENTS

| | | | | |
|---|---|---|---|---|
| 5,205,152 A | * | 4/1993 | Clarke et al. ................ 73/9 |
| 5,216,881 A | * | 6/1993 | Anlauf et al. ............... 60/276 |
| 5,321,979 A | * | 6/1994 | McKendry et al. ......... 73/117.3 |
| 5,492,006 A | * | 2/1996 | Beckett ..................... 73/117.2 |
| 6,338,321 B1 | * | 1/2002 | Denz ....................... 123/90.15 |
| 6,691,653 B2 | * | 2/2004 | Denz ....................... 123/90.15 |
| 6,736,122 B2 | * | 5/2004 | West ........................ 123/690 |
| 6,792,928 B2 | * | 9/2004 | Yasui et al. ............... 123/688 |
| 6,848,301 B2 | * | 2/2005 | Kondo ..................... 73/118.2 |
| 6,968,268 B2 | * | 11/2005 | Yamada et al. ............. 701/111 |
| 7,059,112 B2 | * | 6/2006 | Bidner et al. .............. 60/277 |
| 7,073,465 B2 | * | 7/2006 | Woll et al. ................. 123/1 A |
| 2005/0125139 A1 | | 6/2005 | Keller et al. |

FOREIGN PATENT DOCUMENTS

| | | |
|---|---|---|
| DE | 196 06 054 C2 | 8/1997 |
| DE | 197 36 064 A1 | 2/1999 |
| DE | 103 55 335 A1 | 6/2005 |

OTHER PUBLICATIONS

"Automotive Handbook", 23rd Edition (ISBN 3-528-03876-4) under the name "Broadband Sensor" on p. 524.

* cited by examiner

*Primary Examiner*—Willis R. Wolfe
*Assistant Examiner*—Johnny H. Hoang
(74) *Attorney, Agent, or Firm*—Crowell & Moring LLP

(57) ABSTRACT

In a method for diagnosing a charge cycle valve stroke adjusting system of an internal-combustion engine having at least one exhaust gas sensor which supplies an output signal continuously varying with an exhaust gas constituent, the spread width of the output signal is determined, and compared with a reference value. Defects of the valve stroke adjusting system are detected on the basis of the comparison.

16 Claims, 5 Drawing Sheets

METHOD AND CONTROL DEVICE FOR DIAGNOSING A CHARGE CYCLE VALVE STROKE ADJUSTING SYSTEM OF AN INTERNAL-COMBUSTION ENGINE

BACKGROUND AND SUMMARY OF THE INVENTION

This application claims the priority of German Patent Document DE 10 2005 029 137.6-13, filed Jun. 23, 2005, the disclosure of which is expressly incorporated by reference herein.

The invention relates to a control device and a method for diagnosing a charge cycle valve stroke adjusting system of an internal-combustion engine having at least one exhaust gas sensor which supplies an output signal continuously varying with an exhaust gas constituent.

Such a method and such a control device are disclosed in German Patent Document DE 197 36 064. Moreover, details for a mechanical implementation of a stroke of a charge cycle valve, which can be changed between a minimal and a maximal value, are contained, for example, in German Patent Document DE 196 06 054 C2 (compare particularly FIG. 2 there). A continuous lambda sensor, which can be used as an example for the initially mentioned exhaust gas sensor, is explained, for example, in the "Automotive Handbook", 23rd Edition (ISBN 3-528-03876-4) under the name "Broadband Sensor" on Page 524.

In internal-combustion engines with an adjustable valve stroke, for a given set of operating conditions (for example, rotational speed, temperature, throttle valve opening angle, etc.), the charge of the cylinder/combustion chamber depends on the actually occurring valve stroke. In the case of an operating point plane defined by values of the combustion chamber charge and the rotational speed, when the charges and rotational speeds are low, a small valve stroke is adjusted, which (due in part to the connected higher inflow velocity) improves the mixture preparation in the combustion chamber. If, because of a defect the actual value of the valve stroke does not correspond to its desired value, the air charge also does not correspond to its desired value, which impairs the exhaust gas quality, among other effects. Because of legal requirements, such an exhaust-gas-relevant defect has to be detected by means of on-board devices when used in motor vehicles.

The initially mentioned German Patent Document DE 197 36 064 discloses that such defects can be derived from the signal of continuous lambda sensors. It is suggested there that, in the case of an internal-combustion engine with two continuous lambda sensors, which are each arranged in the exhaust line of a subset of the cylinders of the internal-combustion engine, the difference between the signals of the two sensors is analyzed. If this difference exceeds a predefined threshold value, it is evaluated to be a defect. If the defect occurs in a time relation with a change of the valve stroke, this defect is assigned to the valve stroke adjusting system.

In the case of multi-cylinder internal-combustion engines, various defects may occur in the valve stroke adjusting system. Thus, the valve stroke adjustment of an entire cylinder group (cylinder bank) may operate defectively. However, it is also conceivable that only a single cylinder is affected.

In the former case, a large difference between the lambda sensor signals will occur; while, in the second case, only a smaller difference will occur. A defect detection threshold value therefore has to be so low that it is also exceeded in the event of a defect of an individual cylinder. A low threshold value increases the sensitivity of the diagnosis and thus also the probability that differences occurring in an operation without defects are erroneously detected as defects.

In view of this background, it is an object of the invention to provide a method and apparatus which permit a detection of defects of a valve stroke adjusting system with an increased reliability, and without losses of sensitivity of the detection of actual defects.

This and other objects and advantages are achieved by the method and apparatus according to the invention, in which a measurement of a spread width of the output signal is determined and compared with a reference value. Defects of the valve stroke adjusting system are detected on the basis of the comparison.

In addition to achieving improved reliability when the error detection sensitivity is high, the method according to the invention also has the advantage that it can be used in internal-combustion engines that have only one continuous exhaust gas sensor. This advantage is the result of the fact that defects of the valve stroke adjustment are illustrated by the spread width of the output signal of the exhaust gas sensor.

With a view to further developments of the method, it is preferable that the reference value be dependent on operating parameters of the internal-combustion engine. This development further increases the system's reliability because operating-point-dependent influences on the spread width can be taken into account during the determination of the reference value. For operating points at which comparatively large spread widths occur even when the valve stroke adjusting system has no defect, the reference value is adapted correspondingly.

It is also preferred that, in the case of a first desired value of the valve stroke, the first measurement of a spread width of an output signal of the exhaust gas sensor is defined as the reference value for a second measurement of the spread width of the output signal of the same exhaust gas sensor in the case of a second desired value of the valve stroke. Such before/after comparison also has the advantage that it can be carried out by means of only one exhaust gas sensor. A change of the spread width, which is in a time relation with an output of a changed desired valve stroke value, represents a reliable indication of a defect of the valve stroke adjustment.

It is also preferred that, in the case of an internal-combustion engine with several groups of cylinders and exhaust gas sensors for each cylinder group, a third measurement of a spread width of an output signal of a first exhaust gas sensor of a first group of cylinders is defined as the reference value for a fourth measurement of a spread width of an output signal of a second exhaust gas sensor of a second group of cylinders.

Operating-point-dependent influences change the output signals of both the first exhaust gas sensor and the second exhaust gas sensor. By forming the reference value as a function of the spread width of one of the exhaust gas sensors, operating-point-dependent influences are therefore automatically taken into account. Another advantage lies in the fact that a drift of such influences is also automatically taken into account, because the drift has an effect on the output signals of both exhaust gas sensors.

In another preferred embodiment, the difference between the measurement of the spread width and the reference value is formed and compared with a threshold value if it exceeds the threshold value, a defect is determined to exist. This embodiment permits the definition of a tolerable deviation between the reference value and the measurement for the spread width, which has a positive influence on the reliability of the diagnosis.

It is also preferred that a range of possible values of an output signal of an exhaust gas sensor is divided into different classes of a defined width. A number of classes is then determined in which the output signal or a filtered output signal extends between two successive local extremes (of the output signal). A sum of a predetermined number of detected figures is formed and is used as a measurement for the spread width.

Practical tests have shown that this type of diagnosis, which is also called "rain flow classification", supplies particularly reliable results.

In addition, it is preferred that the filtered output signal is generated by high-pass filtering of the output signal, which has the advantage that a control fluctuation (which may occur in the output signal of the exhaust gas sensor) is filtered out before the analysis. Such a control fluctuation is created by the time delay which occurs between the formation of the mixture before the combustion, and the point in time at which the exhaust gas resulting from the combustion is recorded at the installation site of the exhaust gas sensor. Such a control fluctuation typically has a frequency on the order of 2 Hz, while a valve stroke defect for an individual cylinder of a four-stroke engine (2 crankshaft rotations per working cycle of a cylinder), at a rotational speed of 3,600 $min^{-1}$, assumed as an example, with a frequency of 3,600/50/2 Hz=30 Hz is exhibited in the output signal of an exhaust gas sensor.

In still a further embodiment of the invention, an average value of the output signal is formed, and an integral of absolute amounts of deviations of the output signal from the average value is determined. The integral is used as a measurement for the spread width. By scaling the deviations to the average value and forming the integral, a reliable criterion is also provided for judging the spread width.

According to another alternative, the measurement for the spread width is determined as a standard deviation of values of the output signal from an average value of the output signal. The standard deviation represents, as it were, a classical measurement for spread widths and can therefore also be used within the scope of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
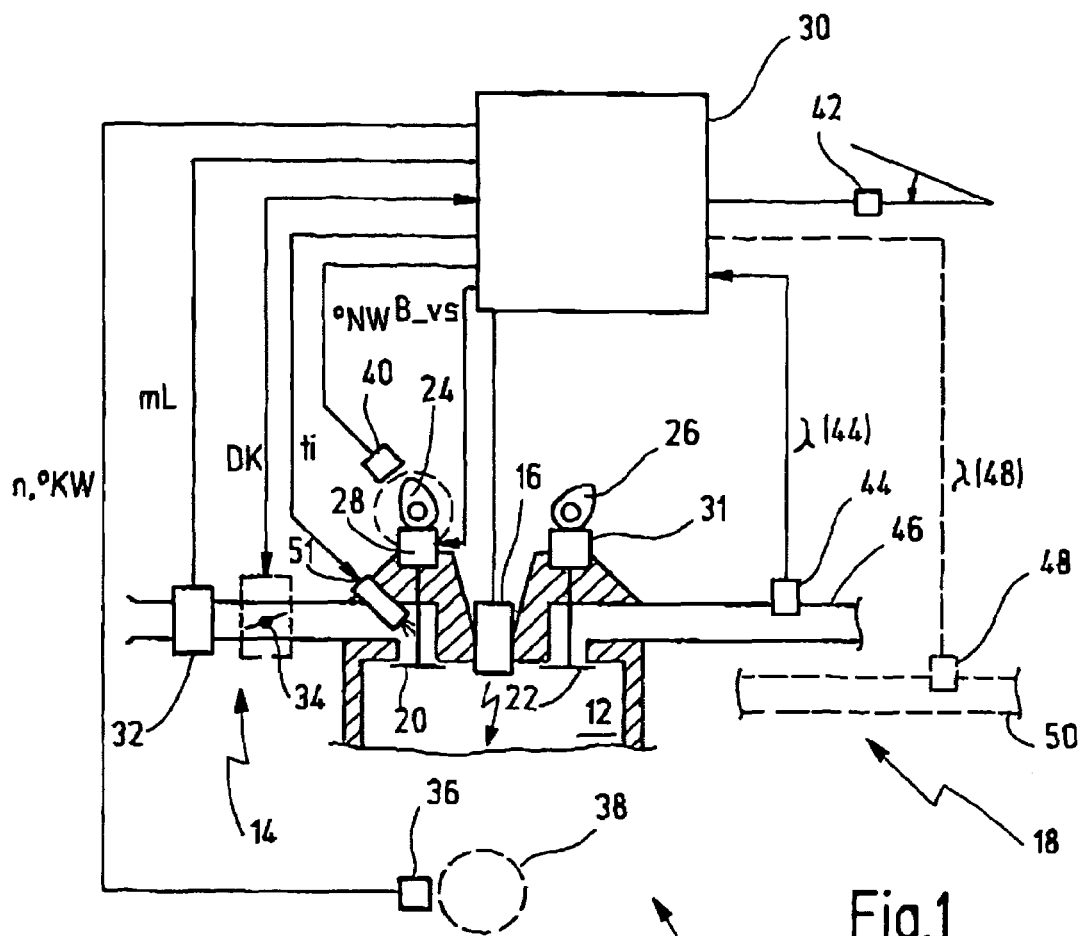
FIG. 1 is a schematic view of the technical environment of the invention.

Referring now to FIG. 1, an internal-combustion engine 10 has at least one combustion chamber/cylinder 12. An air-fuel mixture, which flows into the combustion chamber 12 by way of an intake system 14, is ignited by a spark plug 16. After the combustion, resulting residual gases are removed by way of an exhaust gas system 18. The charging and evacuating of the combustion chamber 12, called the "charge cycle," is controlled by way of at least one intake valve 20 and at least one exhaust valve 22, which are operated by assigned camshafts 24 and 26. Between the intake valve 20 and the assigned camshaft 24, a valve stroke adjusting system 28 is arranged which is triggered by a control device 30 by means of a signal B_vs. A valve stroke adjusting system 31 may also be arranged between the exhaust valve 22 and its assigned camshaft 26.

For controlling the valve stroke and other functions of the internal-combustion engine 10, the control device 30 processes signals of different sensors, which would include, but are not necessarily limited to the following: An air mass meter 32 measures the mass mL of the air flowing into the combustion chambers 12 of the internal-combustion engine 10 which are controlled by the control device 30 by way of a throttle valve 34 by means of a signal DK, which determines the opening angle of the throttle valve 34. The opening angle DK of the throttle valve 34 is therefore known in the control device (or, as necessary, is indicated to the control device by a throttle valve sensor not illustrated in FIG. 1). A crankshaft sensor 36 detects the angular position °KW and the rotational speed n of a crankshaft 38 of the internal-combustion engine 10. Analogously, a camshaft sensor 40 detects the angular position °NW of at least one of the two camshafts 24, 26. A driver's intention indicator 42 transmits a torque demand to the control device 30, and at least one exhaust gas sensor 44, which is arranged in the exhaust gas system 18 of the internal-combustion engine 10, supplies information concerning the concentration of an exhaust gas constituent preferably oxygen) to the control device 30.

In the case of internal-combustion engines 10 with separate exhaust gas pipes 46,50, the control device 30, if required, also receives the signal of an additional exhaust gas sensor 48, which is passed by the flow of the exhaust gas of other cylinders or cylinder groups of the internal-combustion engine 10. The separate exhaust pipes 46, 50 then each guide exhaust gases of individual cylinders or individual groups of cylinders, the exhaust gas sensor 44 being arranged in an exhaust pipe 46, and the exhaust gas sensor 48 being arranged in an exhaust pipe 50.

Figure 2:
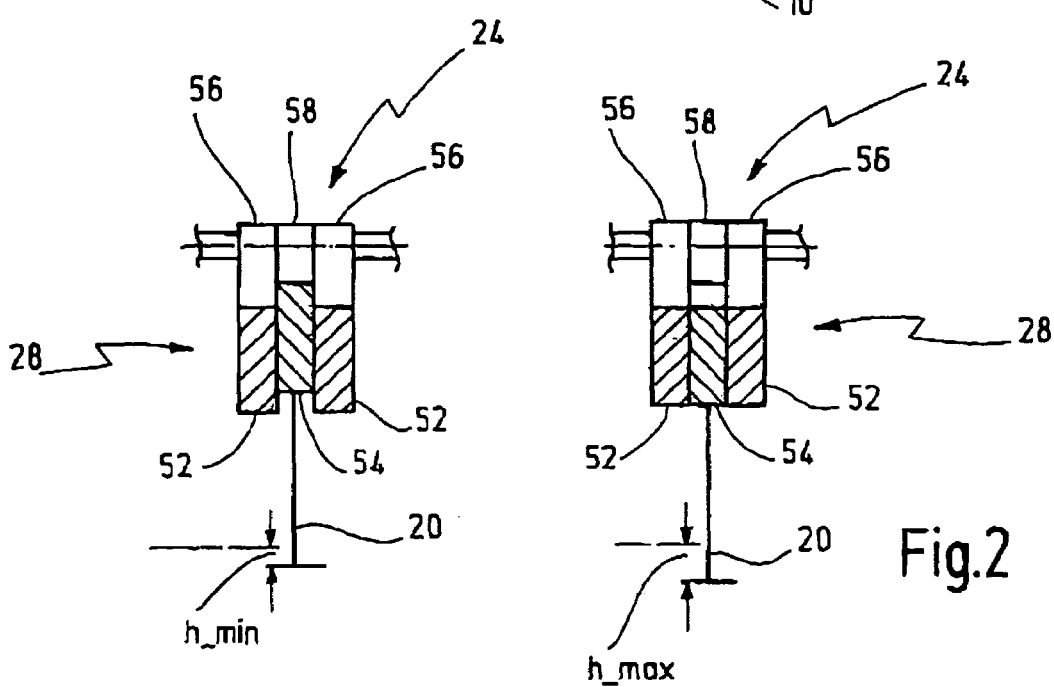
FIG. 2 is a schematic depiction of a known technical implementation of a valve stroke change-over.

FIG. 2 is a schematic illustration of a known technical implementation of a valve stroke change-over for the intake valve 20. The mechanism of the valve stroke adjusting system 28 (herein also called valve stroke actuator 28) has two concentric bucket tappets 52, 54 which can be uncoupled from one another (FIG. 2a) or coupled with one another (FIG. 2b) by the signal B_vs from FIG. 1. The camshaft 24 has cam areas 56, 58 of different eccentricities, with the outer cam areas 56 having a greater eccentricity and interacting with the outer bucket tappet 52. In this case, the intake valve 20 is operated by means of the inner bucket tappet 54.

In FIG. 2a, the two concentric bucket tappets 52 and 54 are not coupled with one another, so that the inner bucket tappet 54 interacts with the area 58 of lower eccentricity of the camshaft 24, which results in a comparatively small valve stroke h_min. In this switching condition of the valve stroke actuator 28, the greater movement of the outer bucket tappet 52 is not transferred to the intake valve 20.

Figure 3:
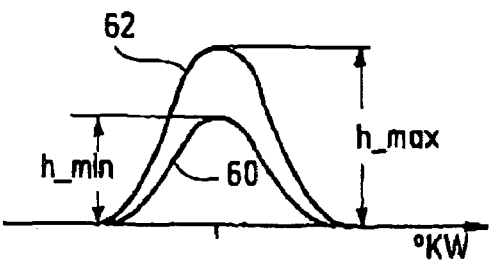
FIG. 3 is a graphic illustration of corresponding courses of the valve stroke over the angle of rotation of the crankshaft.

In contrast, in FIG. 2b, the two bucket tappets 52 and 54 are coupled with one another, which simultaneously leads to an uncoupling of the inner bucket tappet 54 from its assigned cam area 58. In this case, the greater eccentricity of the cam areas 56 is transferred to the intake valve 20 by way of the outer bucket tappet 52 and the inner bucket tappet 54 coupled thereto, which results in a comparatively large valve stroke h_max. FIG. 3 shows resulting valve peak curves 60, 62 over the angular position °KW of the crankshaft 38.

Figure 4:
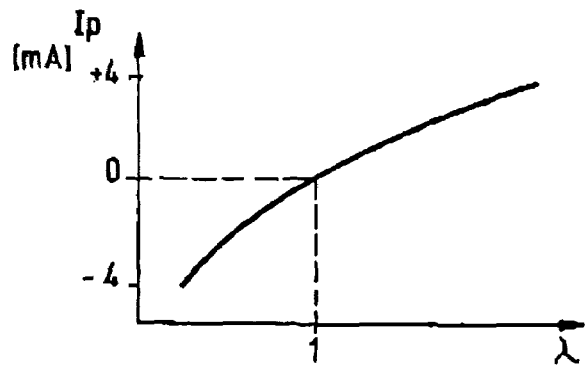
FIG. 4 is a graphic illustration of a characteristic curve of a known continuous exhaust gas sensor.

FIG. 4 shows the continuously extending characteristic curve of the initially mentioned known exhaust gas sensor which supplies a current signal lp as a function of λ. In contrast to the characteristic curve of a Nernst sensor, this characteristic curve has no discontinuities, so that smaller lambda changes result in a measurable change of the output signal lp of the exhaust gas sensor. This is not so in the case of a Nernst sensor outside the discontinuity. Here, as known, lambda represents the so-called air ratio which represents a measurement for the concentration of oxygen as a constituent of the exhaust gas.

Figure 5A:
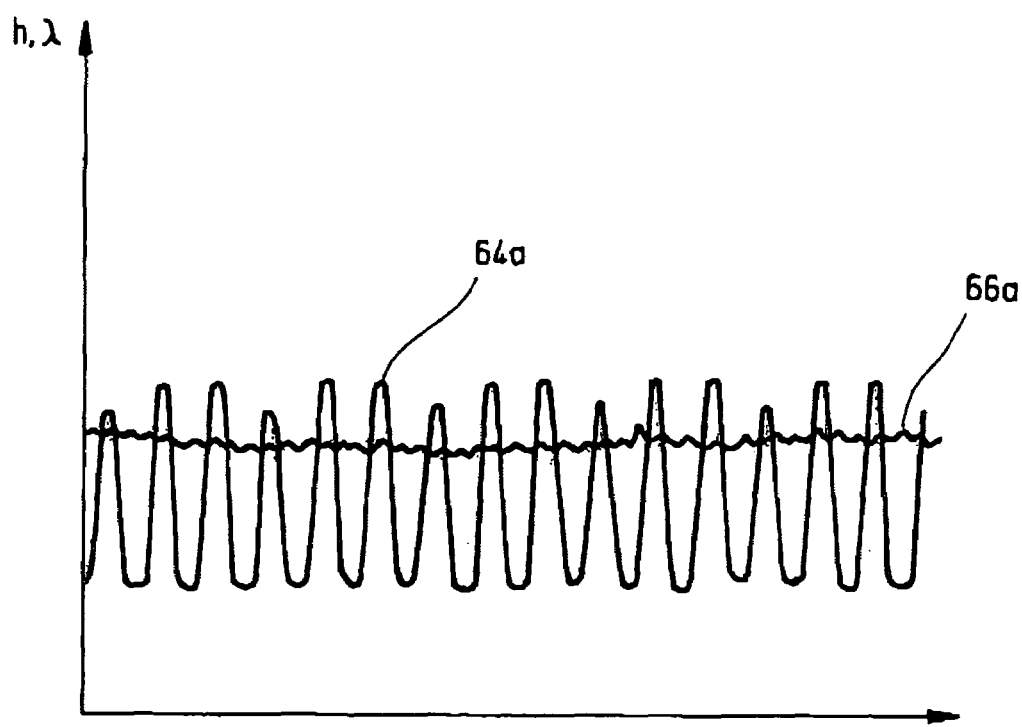
FIGS. 5a and 5b are graphic depictions of correlations taken under controlled test conditions between a valve stroke and a signal of the continuous exhaust gas sensors in a condition of the valve stroke adjusting system without defects and with defects, respectively.

FIGS. 5a and b show correlations taken under controlled test conditions between an intake valve stroke h (signals 64a, 64b) and a signal λ (66a, 66b) of an assigned continuous exhaust gas sensor in a condition of the valve stroke adjusting system without defects (a) and with defects (b). The curves 64a, 66a, 64b, 66b were taken in the case of a six-cylinder engine with two groups of three cylinders respectively and one exhaust gas sensor for each cylinder group. Starting with a certain peak, each third following peak in curves 64aand 64bis therefore part of the same intake valve.

In FIG. 5a, which corresponds to the condition without a defect, all valve peaks in the signal 64a have approximately the same height, and the spread width of the output signal of the pertaining exhaust gas sensor illustrated in the course of curve 66a is small.

Figure 5B:
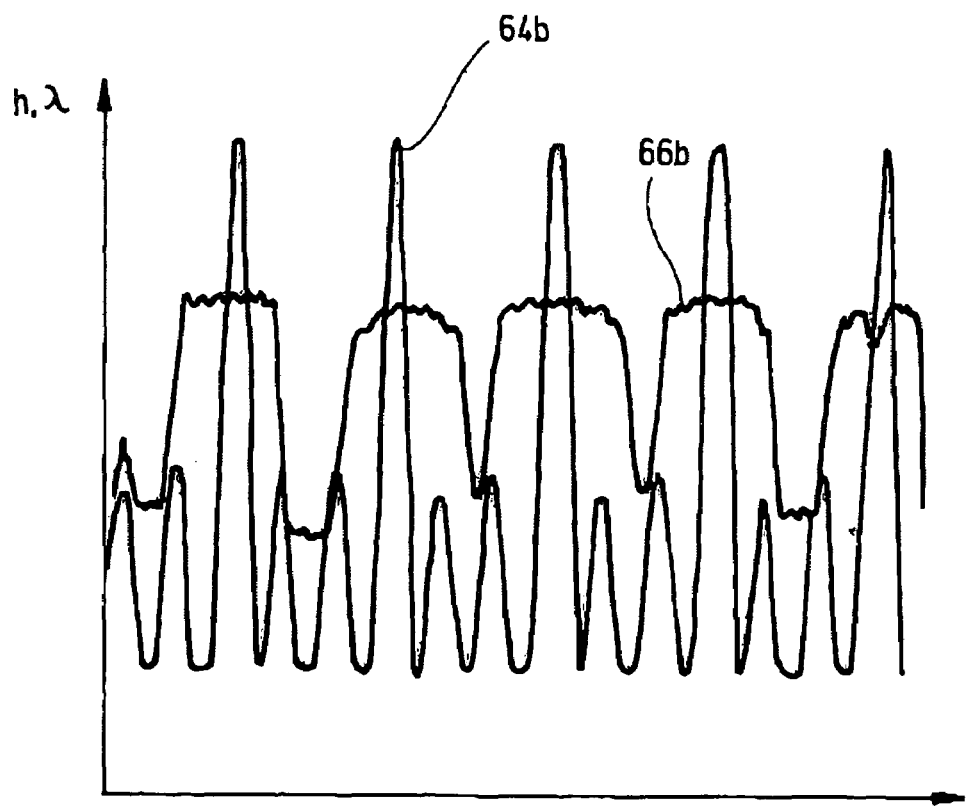

In FIG. 5b, which corresponds to a condition with defects, a large valve stroke occurs in the case of one intake valve while the other intake valve carry out only a small valve stroke. The defective excessively large valve stroke of the one intake valve causes a periodic change of the lambda air ratio, as illustrated in the output signal course 66b of the assigned exhaust gas sensor. The output signal course 66b has a significantly larger spread width than the output signal course 66a. This spread width, which is enlarged in the case of a defect (b), is utilized within the scope of the invention for diagnosing the valve stroke adjusting system.

Figure 6:
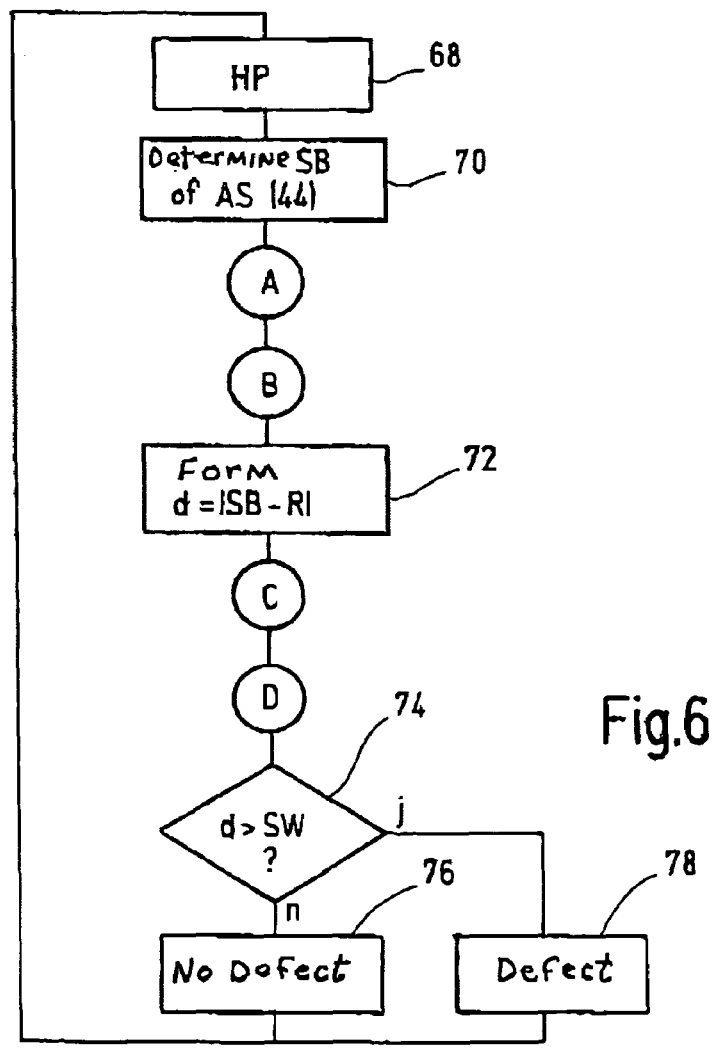
FIG. 6 is a flow chart which illustrates the method according to the invention.

FIG. 6 is a flow chart that illustrates an embodiment of a method according to the invention. In this case, Step 68 represents a higher-ranking main program HP for controlling the internal-combustion engine 10, as executed by the control device 30 of FIG. 1. From this main program HP, a Step 70 is reached, in which a spread width SB of the output signal AS of an exhaust gas sensor (for example, of the output signal AS (44) of exhaust gas sensor 44 from FIG. 1) is determined. This is followed by Step 72, in which a value d is formed as the amount of the difference between the spread width SB defined in Step 70 and a reference value R. The formation of this difference therefore represents a comparison of the measurement of a spread width SB of the output signal with the reference value R. In the following Step 74, the difference d is compared with a threshold value SW. If d is lower than the threshold value SW, the process branches to Step 76, and the valve stroke adjusting system is evaluated to be without defects. If, in contrast, the difference d exceeds the threshold value SW, the program branches to Step 78 in which a defect of the valve stroke adjusting system is detected. The detected defect can be filed, for example, in a defect memory and, after a statistical confirmation, can be indicated to a driver by a defect light. Following this diagnostic routine, the program branches back into the main program in Step 68.

Figure 7:
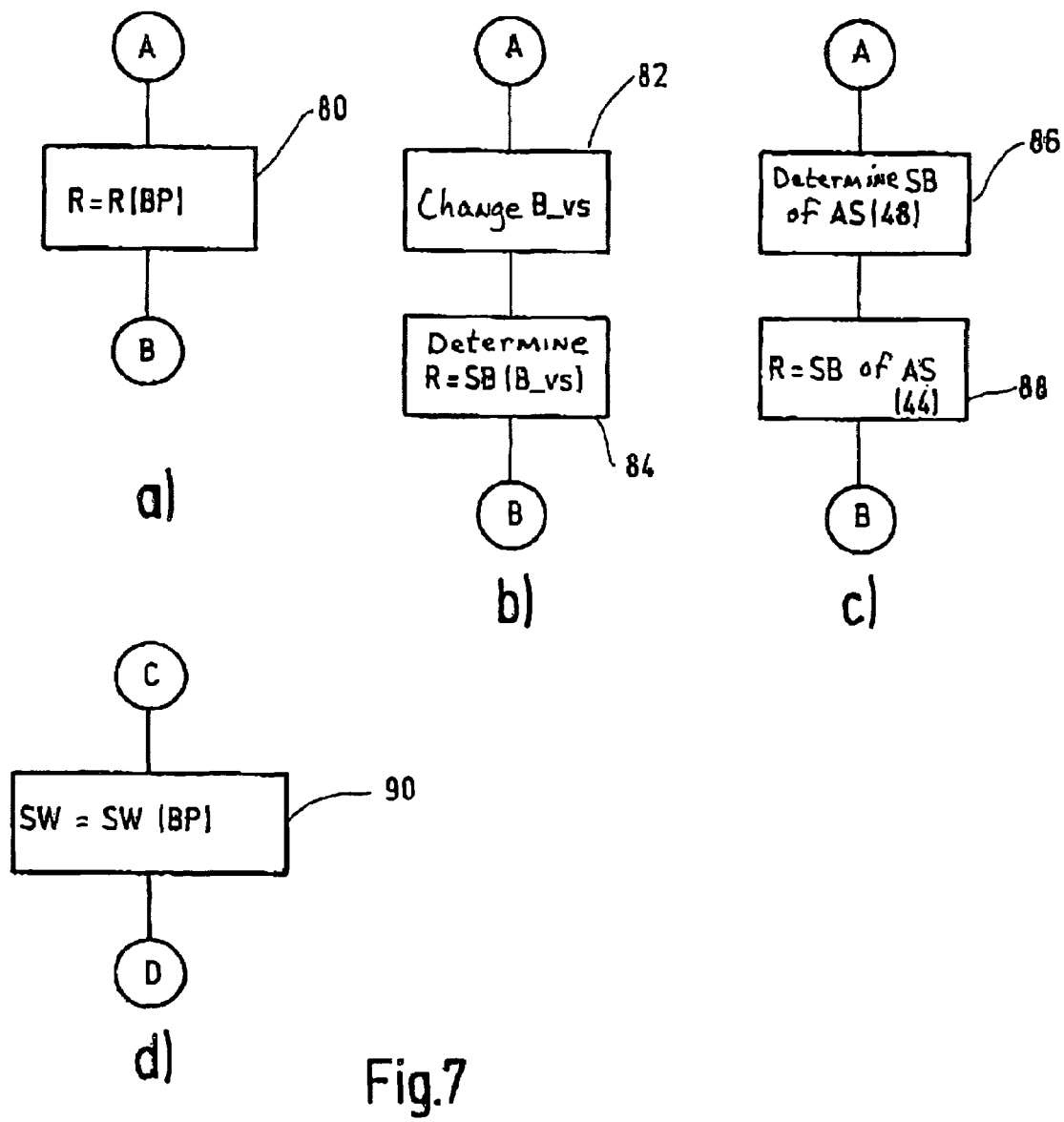
FIGS. 7a-d illustrate various embodiments of the flow chart according to FIG. 6.

FIG. 7 shows different alternatives for the determination of a reference value R, which, in the flow chart of FIG. 6, can take place between Steps 70 and 72, more precisely between Marks A and B, and/or of a reference value R. According to the further embodiment of FIG. 7a, the reference value R is determined as a function of operating parameters BP. Particularly the rotational speed n of the internal combustion engine 10 and a measurement for its load; for example, the mass mL of the taken-in air, the throttle valve angle DK or the signal of the driver's intention indicator 42 can be used here as operating parameters. However, it is understood that this listing is not exhaustive, and that signals of other sensors or values formed in the control device 30, from which finally a measurement for the charging of the combustion chamber 12 can be derived, can also be used as operating parameters BP. This applies, for example, in the case of an injection pulse width it by means of which the injection valve 51 from FIG. 1 is triggered. The embodiment according to FIG. 7d is suitable for the diagnosis of valve stroke adjusting systems in the case of internal-combustion engines with only one exhaust gas sensor 44 as well as for internal-combustion engines with several exhaust gas sensors 44, 48 . . . .

The above applies analogously to the embodiment according to FIG. 7b which, as it were, implements a before/after comparison. In this embodiment, two Steps 82, 84 are executed between Marks A and B, in Step 82, thus after a first spread width SB of the output signal of an exhaust gas sensor had been defined in Step 70, a valve stroke adjustment takes place by changing the signal B_vs. In Step 84, a second spread width SB (B_vs) is then determined at the changed valve stroke and is used as a reference value R for comparison with the first spread width SB previously determined in Step 70 at a different valve stroke.

In contrast to the embodiments according to FIGS. 7a and 7b, the embodiment according to FIG. 7c is suitable only in the case of internal-combustion engines with several exhaust gas sensors 44, 48, . . . . In this embodiment, first, the determination of a spread width SB of the output signal AS of a first exhaust gas sensor, for example, of the exhaust sensor 48 from FIG. 1 takes place in Step 86. Subsequently, the formation of the spread width of the output signal of a second exhaust gas sensor, for example, the exhaust gas sensor 44 from FIG. 1, takes place in Step 88. One of the two determined spread widths, here, the spread width of the output signal of the exhaust gas sensor 44, is then defined as the reference value R.

FIG. 7d shows an embodiment in which the threshold value SW for the comparison (which took place in Step 74) is already further developed as a function of operating parameters BP. The same values as were discussed with reference to FIG. 7a can be used here as the operating parameters BP. The embodiment according to FIG. 7d can be used as an alternative or in addition to the embodiment according to FIG. 7a and in addition to the embodiments according to FIGS. 7b and 7c.

Figure 8:
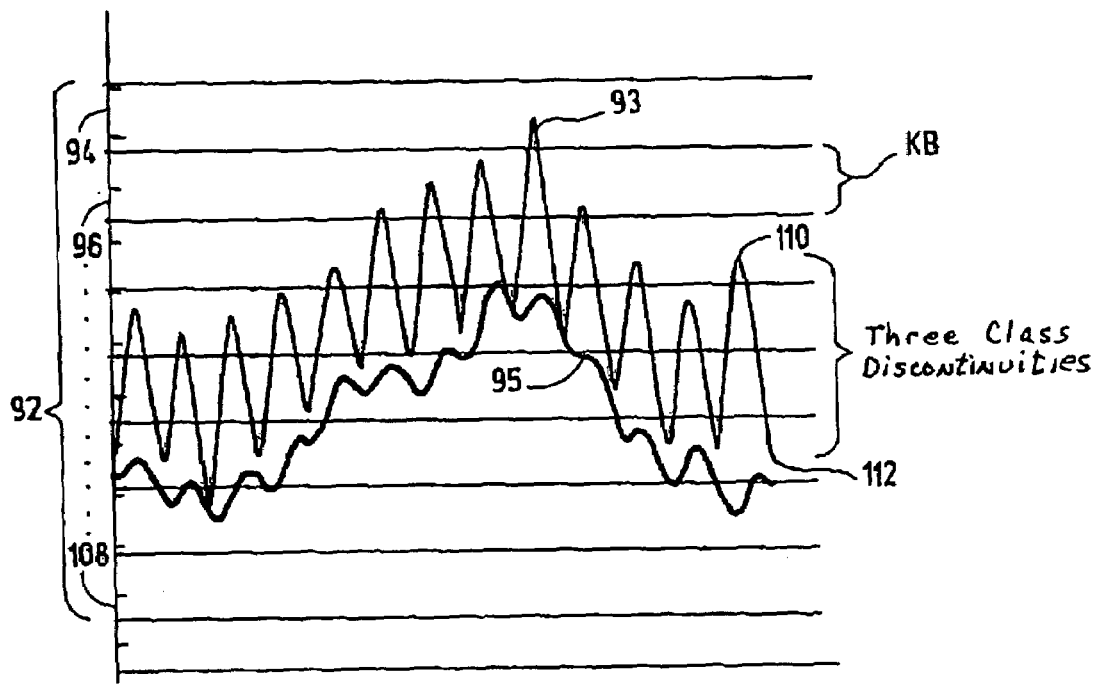
FIG. 8 is a graphic illustration of output signals of continuous exhaust gas sensors in a condition of the valve stroke adjusting system without and with defects for explaining a first possibility (rain flow classification) of the formation of a spread width.

FIG. 8 illustrates a so-called rain flow classification as a possibility for determination of a spread width SB. For this purpose, a range 92 of possible values of an output signal 93, 95 of an exhaust gas sensor is divided into difference classes 94, 96, . . . , 108 of a defined class width KB. During the operation of the internal-combustion engine, a determination is made of the number of class boundaries through which the output signal 93, 95 (or a filtered output signal) passes between two successive local extremes 110, 112. In the case of the extremes 110, 112 from FIG. 8, these are, for example, three class boundaries or class discontinuities. This is repeated, for example, for a predetermined number of periods of the output signal 93, 95, so that a predetermined number of such class discontinuity figures is formed. The figures thus determined are added up and are used as a measurement of the spread width. In FIG. 8, the larger spread width of the output signal 93 again represents a valve stroke adjusting system with defects, while the output signal course 95 is typical of a valve stroke adjusting system without defects. The rain flow classification according to FIG. 8 can still be improved, the output signal 93, 95 is filtered through a high pass in order to filter out control fluctuations of the lambda control, before a determination of the class discontinuity figure.

Figure 9:
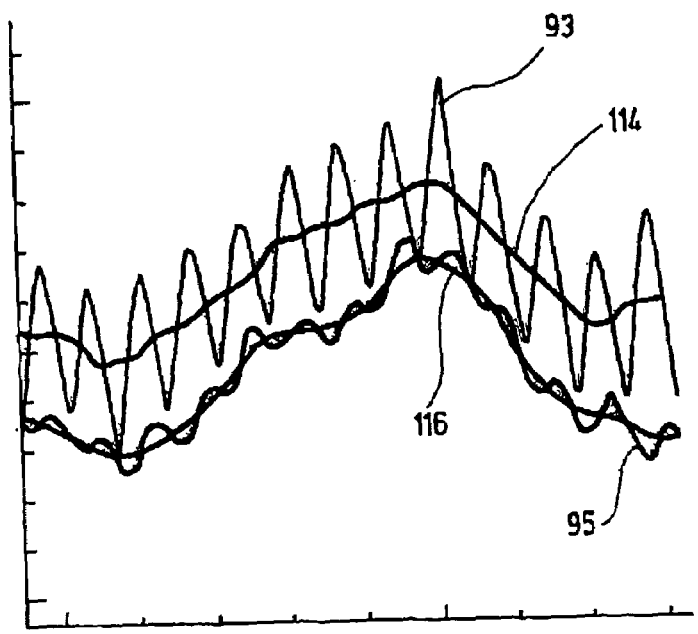
FIG. 9 is a graphic illustration of courses corresponding to FIG. 8 for explaining a second possibility of forming a spread width.

FIG. 9 illustrates an alternative for the determination of a spread width SB of the same output signals 93, 95 which had been explained in connection with FIG. 8. In the embodiment according to FIG. 9, a sliding average value 114, 116 of the output signals 93,95 is formed in each case. Subsequently, deviations of the output signal from its pertaining average value, thus, for example, deviations of the output signal 93 from the average value 114, are rectified and the rectified amounts are added up or integrated. The sums/integrals thus obtained increase monotonically with an increasing spread width of the output signal 93,95 and therefore also represent a suitable measurement for the spread width. In this embodiment, the control fluctuation of the lambda control is compensated, as it were, automatically by the sliding average-value formation. The quality of this method is significantly influenced by the number of values used for the averaging. As a good compromise, an average-value formation took place for 0.07 seconds to 0.1 seconds.

As a further alternative, spread widths can also be determined as customary standard deviations, thus as a root of the sum of squares, scaled to (n–1), of deviations of n output signal values from their average value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of diagnosing a charge cycle valve stroke adjusting system of an internal-combustion engine having at least one exhaust gas sensor which supplies an output signal that continuously varies with an exhaust gas constituent, said method comprising:
    measuring a spread width of said output signal;
    comparing the measured spread width with a reference value; and
    detecting defects of the valve stroke adjusting system based on a result of the comparison; wherein,
    said internal-combustion engine has a plurality of groups of cylinders, and exhaust gas sensors for each cylinder group; and
    measurement of spread width of the output signal of a first exhaust gas sensor for a first group of cylinders is defined as the reference value for measurement of spread width of the output signal of a second exhaust gas sensor for a second group of cylinders.

2. The method according to claim 1, wherein the reference value is determined as a function of operating parameters of the internal-combustion engine.

3. The method according to claim 1, wherein
    the measurement for spread width is determined as a standard deviation of values of the output signal from an average value of the output signal.

4. A method of diagnosing a charge cycle valve stroke adjusting system of an internal-combustion engine having at least one exhaust gas sensor which supplies an output signal that continuously varies with an exhaust gas constituent, said method comprising:
    measuring a spread width of said output signal;
    comparing the measured spread width with a reference value; and
    detecting defects of the valve stroke adjusting system based on a result of the comparison; wherein,
    a difference is determined between the measurement of the spread width and the reference value;
    said difference is compared with the threshold value; and
    when said difference exceeds the threshold value, a defect is determined to exist.

5. The method according to claim 4, wherein a first measurement of spread width of the output signal of the exhaust gas sensor in the case of a first desired value of the valve stroke is defined as the reference value for a second measurement of spread width of the output signal of the same exhaust gas sensor in the case of a second desired value of the valve stroke.

6. The method according to claim 4, wherein the reference value is determined as a function of operating parameters of the internal-combustion engine.

7. The method according to claim 4, wherein
    the measurement for spread width is determined as a standard deviation of values of the output signal from an average value of the output signal.

8. A method of diagnosing a charge cycle valve stroke adjusting system of an internal-combustion engine having at least one exhaust gas sensor which supplies an output signal that continuously varies with an exhaust gas constituent, said method comprising:
    measuring a spread width of said output signal;
    comparing the measured spread width with a reference value; and
    detecting defects of the valve stroke adjusting system based on a result of the comparison; wherein
    a range of possible values of the output signal of a particular exhaust gas sensor is divided into difference classes of a defined width;
    a value is then determined for a number of class boundaries through which the output signal or a filtered output signal passes, between two successive local extremes; and the sum of a predetermined number of determined values is formed and used as a measurement for the spread width.

9. The method according to claim 8, wherein the filtered output signal is generated by high-pass filtering of the output signal.

10. The method according to claim 8, wherein the reference value is determined as a function of operating parameters of the internal-combustion engine.

11. The method according to claim 8, wherein a first measurement of spread width of the output signal of the exhaust gas sensor in the case of a first desired value of the valve stroke is defined as the reference value for a second measurement of spread width of the output signal of the same exhaust gas sensor in the case of a second desired value of the valve stroke.

12. The method according to claim 8, wherein the measurement for spread width is determined as a standard deviation of values of the output signal from an average value of the output signal.

13. A method of diagnosing a charge cycle valve stroke adjusting system of an internal-combustion engine having at least one exhaust gas sensor which supplies an output signal that continuously varies with an exhaust gas constituent, said method comprising:

measuring a spread width of said output signal;
comparing the measured spread width with a reference value; and
detecting defects of the valve stroke adjusting system based on a result of the comparison; wherein, an average value of the output signal is determined;
an integral of absolute amounts of deviations of the output signal from the average value is determined; and
the integral is used as a measurement of spread width.

14. The method according to claim 13, wherein the reference value is determined as a function of operating parameters of the internal-combustion engine.

15. The method according to claim 13, wherein a first measurement of spread width of the output signal of the exhaust gas sensor in the case of a first desired value of the valve stroke is defined as the reference value for a second measurement of spread width of the output signal of the same exhaust gas sensor in the case of a second desired value of the valve stroke.

16. The method according to claim 13, wherein the measurement for spread width is determined as a standard deviation of values of the output signal from an average value of the output signal.

\* \* \* \* \*